United States Patent
Ray et al.

(10) Patent No.: US 12,278,881 B1
(45) Date of Patent: Apr. 15, 2025

(54) DOMAIN AGNOSTIC OFFLINE RUNTIME FOR SINGLE PAGE APPLICATIONS

(71) Applicant: MICROSOFT TECHNOLOGY LICENSING, LLC, Redmond, WA (US)

(72) Inventors: Aninda Ray, Sammamish, WA (US); Andrew James Koltz, Seattle, WA (US); Dennis Joel David Myren, Seattle, WA (US); Naman Kanakiya, Atlanta, GA (US); Roger Allen Lueder, Bellevue, WA (US); Steven Bailey, Bellevue, WA (US); John Fan, Bellevue, WA (US); Edgar Hernandez Gonzalez, Bothell, WA (US)

(73) Assignee: MICROSOFT TECHNOLOGY LICENSING, LLC, Redmond, WA (US)

(*) Notice: Subject to any disclaimer, the term of this patent is extended or adjusted under 35 U.S.C. 154(b) by 0 days.

(21) Appl. No.: 18/494,298

(22) Filed: Oct. 25, 2023

(51) Int. Cl.
*H04L 67/60* (2022.01)
*G06F 16/23* (2019.01)

(52) U.S. Cl.
CPC .......... *H04L 67/60* (2022.05); *G06F 16/2372* (2019.01)

(58) Field of Classification Search
CPC .................................................. H04L 67/60
See application file for complete search history.

(56) References Cited

U.S. PATENT DOCUMENTS

| 8,438,289 B1 | 5/2013 | Grieve et al. |
| 9,774,572 B2 | 9/2017 | Mason et al. |

(Continued)

FOREIGN PATENT DOCUMENTS

| CA | 2782674 A1 | 6/2010 |
| CA | 2786887 A1 | 8/2010 |

(Continued)

OTHER PUBLICATIONS

"Cache Storage", Retrieved from https://developer.mozilla.org/en-US/docs/Web/API/CacheStorage, Jul. 7, 2023, 5 Pages.

(Continued)

*Primary Examiner* — Philip C Lee
(74) *Attorney, Agent, or Firm* — Newport IP, LLC; Jacob P. Rohwer

(57) ABSTRACT

The techniques disclosed herein provide a synchronization engine that operates in conjunction with a service worker to dynamically store and update a working set of user data and single page application (SPA) resources from a network server to a user device. The working set can be hosted across several domains and identified by association with a user account. Accordingly, the synchronization engine retrieves the working set from the network server to enable offline execution of the single page applications. As such, subsequent requests for interacting with a single page application are then serviced by the synchronization engine using the working set retrieved from the network server. For instance, the service worker can bind user data to the application resources to enable progressive rendering through an application controller using locally available resources. In this way, the disclosed system provides a consistent user experience irrespective of network connectivity.

20 Claims, 10 Drawing Sheets

(56) References Cited

U.S. PATENT DOCUMENTS

| | | | |
|---|---|---|---|
| 9,967,309 | B2 | 5/2018 | Brown et al. |
| 10,496,381 | B2 | 12/2019 | Seksenov et al. |
| 10,652,087 | B2 | 5/2020 | Varney et al. |
| 10,958,662 | B1 | 3/2021 | Sole et al. |
| 2014/0173088 | A1 | 6/2014 | Varney et al. |
| 2016/0080280 | A1 | 3/2016 | Ramachandran et al. |
| 2016/0100030 | A1 | 4/2016 | Brown et al. |
| 2017/0034306 | A1 | 2/2017 | Thangeswaran |
| 2019/0045026 | A1* | 2/2019 | Sekharan ............. H04L 67/59 |
| 2019/0065217 | A1 | 2/2019 | Girdhar et al. |
| 2021/0084038 | A1* | 3/2021 | Feasel ................ G06F 21/629 |
| 2021/0377332 | A1* | 12/2021 | Ray .................... H04L 67/02 |
| 2023/0052991 | A1* | 2/2023 | Ricklis ............... G06F 16/958 |
| 2023/0305819 | A1* | 9/2023 | Haug .................... G06F 8/38 |

FOREIGN PATENT DOCUMENTS

| | | |
|---|---|---|
| CA | 3060362 A1 | 2/2019 |
| CN | 110209980 A | 9/2019 |
| CN | 111859211 A | 10/2020 |
| CN | 114416040 A | 4/2022 |
| WO | 2018149395 A1 | 8/2018 |

OTHER PUBLICATIONS

"Service workers", Retrieved from https://web.dev/learn/pwa/service-workers/#scope, Aug. 18, 2023, 9 Pages.

"Using Service Workers", Retrieved from https://developer.mozilla.org/en-US/docs/Web/API/Service_Worker_API/ Using_Service_Workers#basic_architecture, Aug. 18, 2023, 18 Pages.

Vanhala, Janne, "Implementing an Offline First Web Application", In Thesis of Espoo, Master's Programme in Computer, Communication and Information Sciences, School of Science, Aalto University, Nov. 2, 2017, 52 Pages.

Decision to grant a European patent pursuant to Article 97(1) received in European Application No. 21718997.6, mailed on Aug. 22, 2024, 2 pages.

Communication under Rule 71(3) Received in European Patent Application No. 21718997.6, mailed on May 31, 2024, 08 pages.

Extended European search report received in European Application No. 24197245.4, mailed on Nov. 18, 2024, 11 pages.

"Add to Home screen", Retrieved from: https://web.archive.org/web/20190922205303/https:/developer.mozilla.org/en-US/docs/Web/Progressive_web_apps/Add_to_home_screen, Sep. 22, 2019, 11 Pages.

"Cache", Retrieved from: https://web.archive.org/web/20200414115832/https:/developer.mozilla.org/en-US/docs/Web/ API/Cache, Apr. 14, 2020, 12 Pages.

"Fetch", Retrieved from: https://web.archive.org/web/20200423220118/https:/fetch.spec.whatwg.org/, Apr. 23, 2020, 84 Pages.

"IHttpModule Interface", Retrieved from: https://web.archive.org/web/20190522173808/https:/docs.microsoft.com/en-US/dotnet/api/system.web.ihttpmodule?view=netframework-4.8, May 22, 2019, 2 Pages.

"IndexedDB API", Retrieved from: https://web.archive.org/web/20200303114823/https:/developer.mozilla.org/en-US/docs/Web/API/IndexedDB_API, Mar. 3, 2020, 8 Pages.

"Introduction to Service Worker", Retrieved from: https://web.archive.org/web/20200118004823/https:/developers.google.com/web/ilt/pwa/introduction-to-service-worker, Jan. 18, 2020, 8 Pages.

"Progressive web apps (PWAs)", Retrieved from: https://web.archive.org/web/20200229191645/https:/developer.mozilla.org/en-US/docs/Web/Progressive_web_apps, Feb. 29, 2020, 4 Pages.

"Pwastats", Retrieved from: https://web.archive.org/web/20200319105506/https:/www.pwastats.com/, Mar. 19, 2020, 3 Pages.

"Service Worker API", Retrieved from: https://web.archive.org/web/20200417074653/https:/developer.mozilla.org/en-US/docs/Web/API/Service_Worker_API, Apr. 17, 2020, 9 pages.

"StorageQuota", Retrieved from: https://web.archive.org/web/20191205113734/https:/developer.mozilla.org/en-US/ docs/Web/API/StorageQuota, Dec. 5, 2019, 6 pages.

"Streams API", Retrieved from: https://web.archive.org/web/20200106130303/https:/developer.mozilla.org/en-US/docs/ Web/API/Streams_API, Jan. 6, 2020, 14 Pages.

"Web app manifests", Retrieved from: https://web.archive.org/web/20160320024039/https:/developer.mozilla.org/en-US/docs/Web/Manifest, Mar. 20, 2016, 06 Pages.

"Workbox Navigation Preload", Retrieved from: https://web.archive.org/web/20191207075416/https:/developers. google.com/web/tools/workbox/modules/workbox-navigation-preload, Dec. 7, 2019, 3 Pages.

"Workbox", Retrieved from: https://web.archive.org/web/20200417221035/https:/developers.google.com/web/tools/workbox, Apr. 17, 2020, 9 Pages.

Archibald, Jake, "Speed up Service Worker with Navigation Preloads", Retrieved from: https://web.archive.org/web/20170430114232/https:/developers.google.com/web/updates/2017/02/navigation-preload, Apr. 30, 2017, 8 Pages.

Caplin, Mark J., "Developing a Large Scale Application with a Single Page Application (SPA) using AngularJS", Retrieved from: https://www.codeproject.com/Articles/808213/Developing-a-Large-Scale-Application-with-a-Single, Aug. 31, 2014, 31 Pages.

Dumitru, Catalin, "Dynamic Page Assembly using Service Workers", Retrieved from: http://colin-dumitru.github.io/ service-workers/tutorial/2014/12/14/dynamic-page-assembly.html, Dec. 14, 2014, 9 Pages.

Elsaadawy M., et al., "Enabling efficient application monitoring in cloud data centers using SDN", arXiv: 1902.11292, https://doi.org/10.48550/arXiv. 1902.11292, Sections 4 and 5, Feb. 28, 2019, 14 pages.

Final Office Action mailed on Jul. 1, 2022, in U.S. Appl. No. 16/944,842, 10 pages.

International Search Report and Written Opinion received for PCT Application No. PCT/US21/023551, Jun. 21, 2021, 12 pages.

Losoviz, Leonardo, "Implementing a Service Worker for Single-Page App WordPress Sites", Retrieved from: https://www.smashingmagazine.com/2017/10/service-worker-single-page-application-wordpress-sites/, Oct. 11, 2017, 55 Pages.

Non-Final Office Action mailed on Dec. 24, 2021, in U.S. Appl. No. 16/944, 842, 9 pages.

Notice of Allowance mailed on Sep. 20, 2022, in U.S. Appl. No. 16/944, 842, 13 pages.

Richard, et al., "What makes a good Progressive Web App?", Retrieved from: https://developers.google.com/web/progressive-web-apps/checklist#baseline, Jan. 6, 2020, 6 Pages.

* cited by examiner

INTERCEPT, BY THE SERVICE WORKER, A REQUEST DEFINING A SECOND PLURALITY OF INFORMATION UNITS ASSOCIATED WITH A SINGLE PAGE APPLICATION OF THE PLURALITY OF SINGLE PAGE APPLICATIONS SERVED BY THE SERVICE WORKER WHEREIN THE SECOND PLURALITY OF INFORMATION UNITS IS A SUBSET OF THE FIRST PLURALITY OF INFORMATION UNITS STORED WITHIN THE SYNCHRONIZATION ENGINE
510

MATCH THE REQUEST WITH A ROUTE PATH IN AN ENTRY OF A ROUTING TABLE
512

DETERMINE, FROM THE ENTRY OF THE ROUTING TABLE, AN IDENTIFICATION OF THE SINGLE PAGE APPLICATION OF THE PLURALITY OF SINGLE PAGE APPLICATIONS
514

RETRIEVE THE SECOND PLURALITY OF INFORMATION UNITS FROM THE LOCAL SYNCHRONIZATION ENGINE
516

INVOKE EXECUTION OF THE SINGLE PAGE APPLICATION UTILIZING THE SECOND PLURALITY OF INFORMATION UNITS RETRIEVED FROM THE SYNCHRONIZATION ENGINE
518

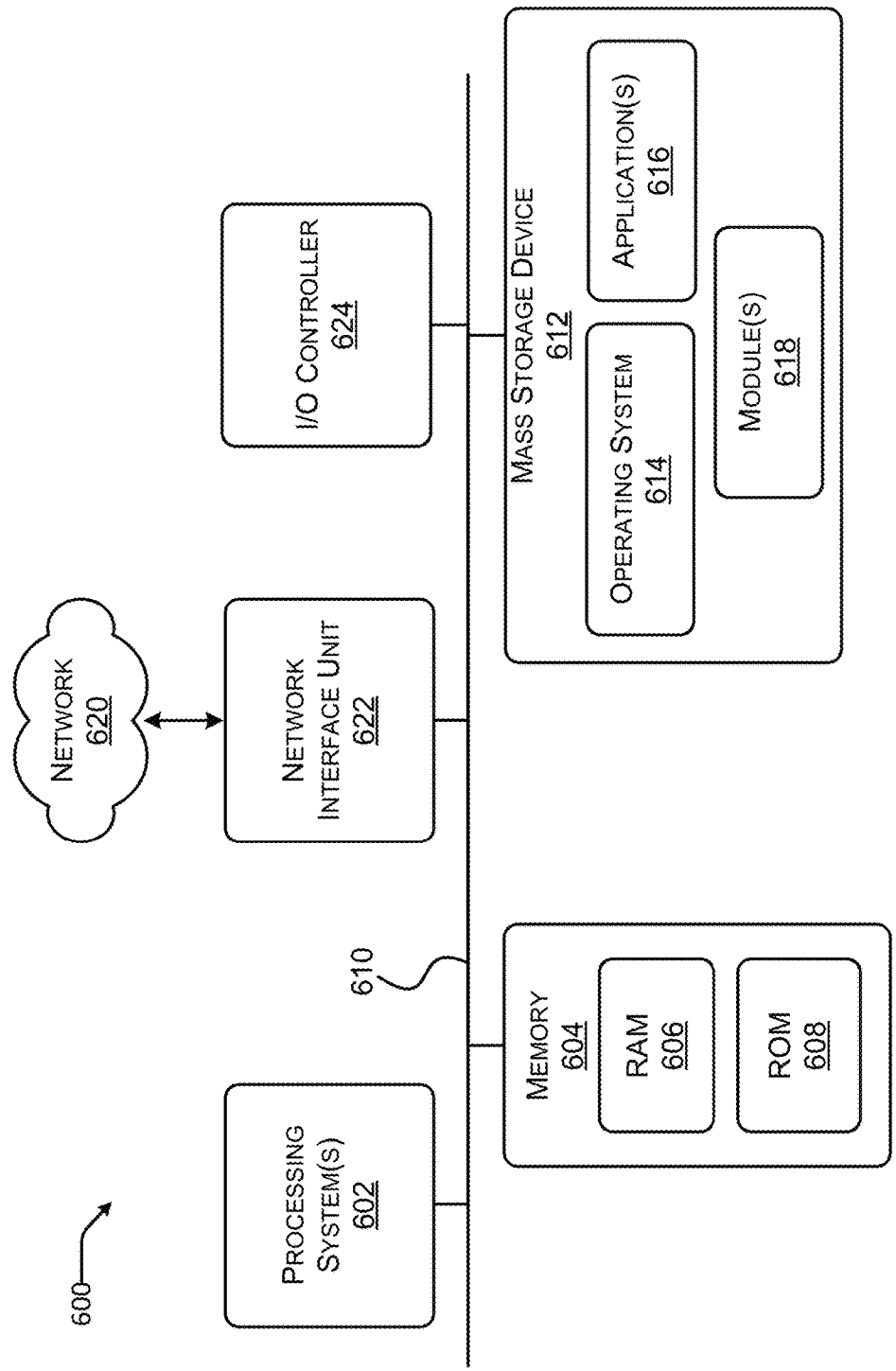

DOMAIN AGNOSTIC OFFLINE RUNTIME FOR SINGLE PAGE APPLICATIONS

BACKGROUND

As more and more data are stored and accessed through network connections (e.g., cloud-based services), the design and architecture of software user experiences has likewise shifted. Where past users utilized standalone native applications to perform various tasks, modern users can rely on a suite of rich web applications accessed via a web browser. One type of web application is a single page application (SPA) which interacts with the web browser to write data to a web page without requiring the loading of the entire web page. Through the use of a single page application, code (e.g., Hyper-Text Markup Language (HTML), JavaScript, Cascading Style Sheets (CSS)) for rendering a web page can be retrieved by the browser via local files stored on a device executing the browser. That is, a user device has the ability to initially download a single page application from a network server and subsequently execute the file(s) from local storage without having to depend on a network connection to a network server (e.g., client-side rendering).

In this way, a single page application can provide a smooth user experience through reduced perceived loading times thus combining the feel of a native application with the enhanced functionality of a web application. Consequently, many organizations (e.g., companies) have realized the potential of utilizing suites of single page applications to reduce the operational costs of native applications (e.g., managing software licenses) to provide users (e.g., employees, customers) with software tools. As such, an organization can, through a network service provider (e.g., a cloud service provider), provide a suite of single page applications for users to store, access, and operate on data.

Accordingly, a service worker can be deployed to manage suites of single page applications. A service worker is a programmable network proxy configured between a web browser and a network server. The service worker is capable of intercepting requests from the browser and enabling communications with a single page application stored locally on the device. More specifically, a service worker is a script that a browser executes in the background, separate from execution of a web page, which allows a single page application to independently control the handling of network requests for the web page.

However, while single page applications can enhance the user experience through reduced perceived loading times, single page applications are nonetheless dependent on a consistent network connection to maintain various functionalities. That is, while the code for rendering a web page is stored locally, the data that is written to the web page is periodically retrieved by the service worker from a network server. Stated another way, many existing web application paradigms are constructed with the assumption that an end user will always have access to consistent and fast connectivity. Consequently, a temporary disconnection or slow network service is regarded as an error.

In an increasingly mobile world, such assumptions may prove untenable. For example, a user may be interacting with a calendar single page application with the benefit of a consistent and fast network connection (e.g., while at the office). Accordingly, the code for rendering the single page application (e.g., the calendar grid, buttons for creating events) is stored locally while user data (e.g., upcoming meetings, contact information) is retrieved from a network server and utilized to populate the calendar. However, if the user then experiences a network disconnection (e.g., they leave the office), the service worker cannot retrieve their user data and thus the calendar single page application will cease to function properly.

It is with respect to these and other considerations that the disclosure made herein is presented.

SUMMARY

The techniques disclosed herein provide a synchronization engine that operates in conjunction with a service worker to dynamically store and update a working set of user data and single page application (SPA) resources from a network server to a user device (e.g., a laptop, a smartphone). In this way, the synchronization engine enables a consistent and reliable user experience irrespective of network connectivity. Stated alternatively, following an initial installation phase in which single page applications and user data associated with a given user account are retrieved and stored locally, a user can access the single page applications and user data even while the user's device is offline (e.g., not connected to a network such as the Internet).

In one example, the installation phase is triggered in response to a user visiting a single page application for the first time. In another example, the installation phase is triggered in response to detecting a modification to the working set at the network server (e.g., visiting a new single page application, an application update, a new dataset). For instance, the synchronization engine can, upon a network reconnection, detect the modification and initiate the installation operation via the service worker. As described herein, the service worker is capable of serving multiple single page applications that are hosted across multiple uniform resource locator (URL) spaces (e.g., a domain in which one or more single page applications are hosted).

Accordingly, the synchronization engine can extract and store a first plurality of information units from a network resource (e.g., a network server) via a network connection between the computing device and the network resource. The first plurality of information units can comprise a full working set (e.g., all single page application resources and user data). For instance, in an initial installation phase in which the synchronization engine first retrieves single page application resources and user data. Alternatively, the first plurality of information units can be restricted to a portion of the working set that was modified such as updated code, new user data, and so forth.

Following the data retrieval and storage by the synchronization engine, the user device can be deemed offline-capable. That is, the user device can lose network connectivity and maintain some or all single page application functionality. Accordingly, the service worker can intercept a request defining a second plurality of information units associated with a single page application (e.g., a document request). In one example, the second plurality of information units is a subset of the first plurality of information units retrieved by the synchronization engine. Conversely, the second plurality of information units may not include data from the first plurality of information units but is nonetheless stored by the synchronization engine.

The service worker can subsequently match the request with an entry of a routing table where the entry defines a route path for locating the second plurality of information units defined by the request. In various examples, the route path is a URL relative to a host name with the query string removed. In other words, the route path is the remaining portion of the URL after the host name and the query string are removed. In accordance with dynamic URLs and static URLs, a route path can be a dynamic route path or a static route path. In case of a match (e.g., a cache hit, a synchronization engine synchronization match), the service worker is configured to use the entry to identify a single page application to which the route path refers and invokes a corresponding application controller for the single page application. Accordingly, the second plurality of information units is retrieved from the synchronization engine by the application controller and the single page application is initiated and executed by the application controller.

Moreover, the service worker can be configured to issue the request to the synchronization engine in parallel to matching the request with the entry of the routing table. In a specific example, the request relates to a URL that is among the working set but is not among the entries of the routing table (i.e., the computing device has not previously visited the URL). Consequently, the routing table lookup results in a miss. However, by also issuing the request to the synchronization engine, the service worker can determine that the URL has been retrieved as part of the working set. In this way, the service worker can serve requests for previously unvisited URLs while offline.

In contrast to existing approaches, the disclosed system is constructed from an "offline-first" perspective in which the offline experience of a single page application is explicitly prioritized as opposed to an "offline-then" method in which the offline experience is a merely a backup to an online experience. For instance, in an "offline-then" system, a given single page application may be incapable of offline operation without a user first navigating to the single page application while network connectivity is available. That is, single page applications and user data are not synchronized to a user device for offline use without an explicit request from the user. Conversely, in an "offline-first" system an entire working set for a user is synchronized to enable the user to use a single page application while offline even without the user having visited the single page application previously. In this way, the disclosed system provides a smooth user experience independent of network connectivity and/or usage history.

In another example of the technical benefit of the present disclosure, a software architecture that assumes no network connectivity can ensure a consistent user experience in the face of inconsistent or low-quality network connections. For example, the code for rendering a single page application such as a Hyper-Text Markup Language (HTML) file can be generated dynamically from resources that are stored locally by the synchronization engine. In contrast, many existing systems utilize pre-generated HTML files that utilize resources (e.g., scripts) that have expired or are otherwise locally unavailable leading to visual and/or functional errors. In this way, the present system minimizes such errors thereby improving the offline user experience.

In still another example of the technical benefit of the present disclosure, by constructing single page applications from an "offline-first" perspective, the disclosed techniques enable single page applications to gracefully transition between network connectivity states (e.g., online to offline). As mentioned above, existing systems are largely built on the assumption of permanent and fast connectivity. Consequently, such systems can be poorly equipped to handle such transitions between network connectivity states which are often unpredictable and sudden (e.g., a service outage). In contrast, by preemptively storing a working set, the present system can provide distinctions between features that are offline capable (e.g., viewing and editing data) versus features that require a network connection (e.g., file sharing and collaboration). Consequently, each single page application can be configured to be "offline aware" and selectively disable certain features that are not offline capable in response to a loss of network connectivity. In this way, the disclosed system further ensures a seamless and consistent user experience.

Features and technical benefits other than those explicitly described above will be apparent from a reading of the following Detailed Description and a review of the associated drawings. This Summary is provided to introduce a selection of concepts in a simplified form that are further described below in the Detailed Description. This Summary is not intended to identify key or essential features of the claimed subject matter, nor is it intended to be used as an aid in determining the scope of the claimed subject matter. The term "techniques," for instance, may refer to system(s), method(s), computer-readable instructions, module(s), algorithms, hardware logic, and/or operation(s) as permitted by the context described above and throughout the document.

BRIEF DESCRIPTION OF THE DRAWINGS

The Detailed Description is described with reference to the accompanying figures. In the figures, the left-most digit(s) of a reference number identifies the figure in which the reference number first appears. The same reference numbers in different figures indicate similar or identical items. References made to individual items of a plurality of items can use a reference number with a letter of a sequence of letters to refer to each individual item. Generic references to the items may use the specific reference number without the sequence of letters.

FIG. 5B is a flow diagram showing additional aspects of the process for retrieving and storing information units using a synchronization engine to enable offline functionality of single page applications.

FIG. 6 is a computer architecture diagram illustrating an illustrative computer hardware and software architecture for a computing system capable of implementing aspects of the techniques and technologies presented herein.

DETAILED DESCRIPTION

The techniques and technologies disclosed herein enable a synchronization engine, in conjunction with a service worker that is configured to serve a plurality of single page applications, to retrieve and store a working set of user data and single page application (SPA) resources from a network server to a user device (e.g., a laptop, a smartphone). In this way, the synchronization engine enables a consistent and reliable user experience irrespective of network connectivity. Moreover, the synchronization engine can be configured to detect changes to the working set at the network server such as updates to single page applications and modifications to user data. In response, the synchronization engine can initiate an update operation via the service worker.

Various examples, scenarios, and aspects of the disclosed techniques are described below with reference to FIGS. 1-7.

Figure 1:
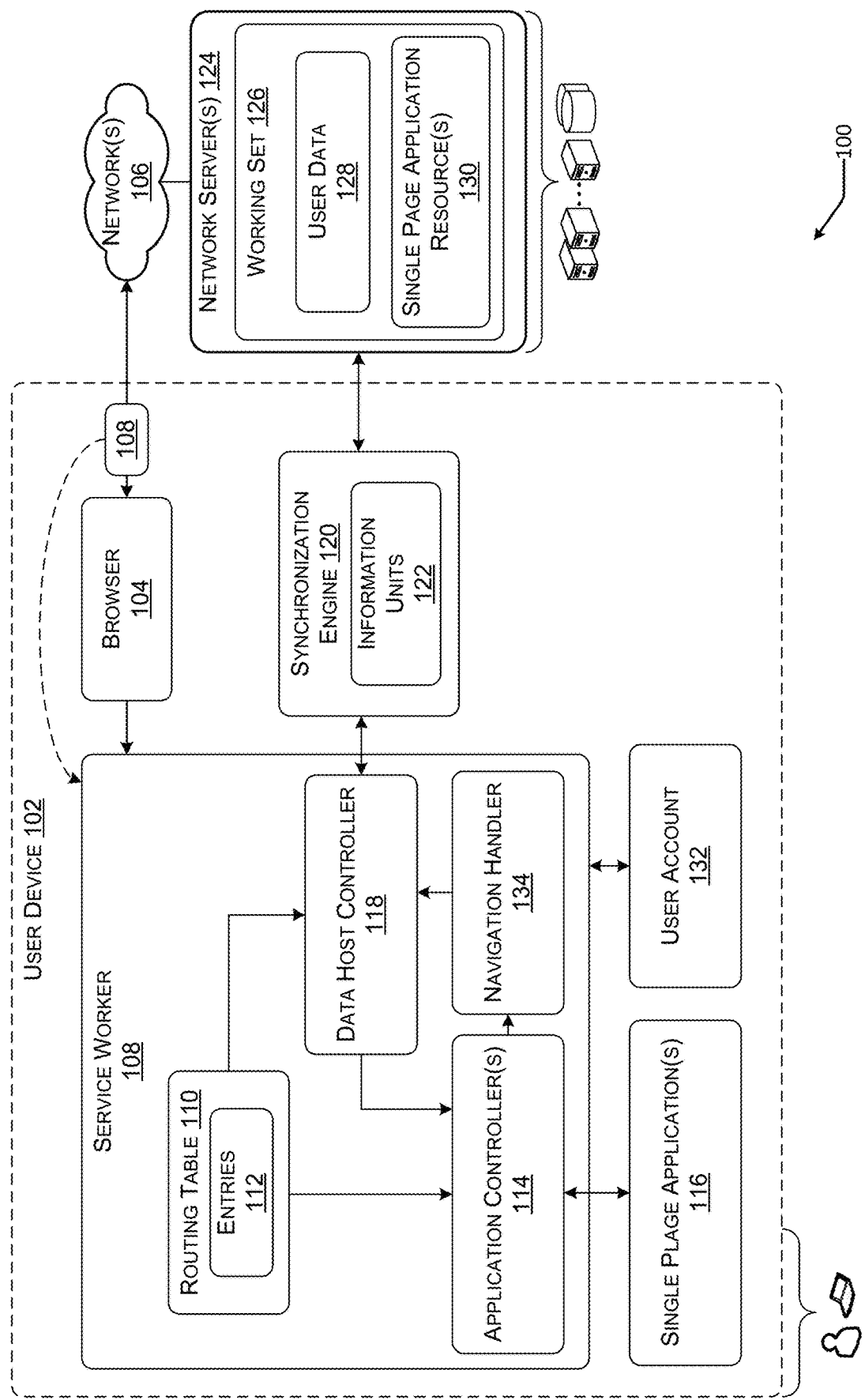
FIG. 1 is a diagram illustrating an environment in which a synchronization engine retrieves, via a network connection, and stores data and single page application resources for offline use.

FIG. 1 illustrates an environment 100 in which a synchronization engine is configured to retrieve a plurality of information units comprising user data and/or single page application resources for offline use. As shown in FIG. 1, a user device 102 such as a laptop, a tablet, and/or a smartphone is executing a browser 104 displaying a web page in a window and/or a tab served via a connection to a network 106. As part of the execution, the browser 104 is configured to initiate a request for data that corresponds to the displayed web page via an associated uniform resource locator (URL). In the present example, the request initiated by the browser 104 invokes functionality of a single page application (e.g., checking email).

In response, a service worker 108 that is configured on the user device 102, and that is positioned between the browser 104 and the network 106 intercepts the request. The service worker 108 is a software component that the browser 104 executes in the background via a worker thread that is separate from a main thread that executes the displayed web page. To process the request, the service worker 108 utilizes a routing table 110 containing a plurality of entries 112 that associate a URL, or a portion of a URL, with an identification of an application controller 114 and/or a single page application 116. The service worker 108 can accordingly match a URL associated with the request against a URL listed in an entry 112 of the routing table 110.

Moreover, the service worker 108 can be configured to issue the request to the synchronization engine 120 in parallel to matching the request with the entry 112 of the routing table 110. In a specific example, the request relates to a URL that is among the working set 126 but is not among the entries 112 of the routing table 110 (i.e., the user device 102 has not previously visited the URL). Consequently, the lookup at the routing table 110 results in a miss. However, by simultaneously issuing the request to the synchronization engine 120, the service worker 108 can determine that the URL has been retrieved as part of the working set 126. In this way, the service worker 108 can serve requests for previously unvisited URLs even while disconnected from the network 106 and/or the network server 124.

The application controller 114 manages the operation of an associated single page application 116. Since the service worker 108 is configured to serve a plurality of single page applications 116, a corresponding plurality of application controllers 114 can be installed on the user device 102. Accordingly, each application controller 114 is configured to execute code to initialize the single page application and define URLs that are under its purview. As such, requests matching an entry 112 of the routing table 110 can be routed to an application controller 114 for further processing.

In the event of a match identifying an application controller 114 and/or a single page application 116, the service worker 108 proceeds to retrieve the data associated with the request. To accomplish this, the service worker 108 invokes a data host controller 118 to proxy the data retrieval operation to a synchronization engine 120. The synchronization engine 120 is responsible for retrieving and storing a plurality of information units 122 from a network server 124. In various examples, the plurality of information units 122 is retrieved from a working set 126 comprising user data 128 as well as single page application resources 130. User data 128 includes any data generated and/or consumed by an end user, which is used to populate a single page application 116. For instance, the user data 128 can include work files, contact information, schedule events, and the like. In contrast, single page application resources 130 include any resources that enable an application controller 114 to operate a single page application 116 such as code (e.g., Hyper-Text Markup Language (HTML), JavaScript, Cascading Style Sheets (CSS)) for rendering a web page as well as static resources such as images, fonts, and the like. As such, a working set 126 defines any such user data 128 and/or single page application resources 130 that are associated with a given user account 132.

Upon an initial visit to a single page application 116, the browser 104 can initiate an installation operation to synchronize a working set 126 from the network server 124. As such, the information units 122 retrieved by the synchronization engine 120 from the network server 124 comprises the full working set 126. As will be elaborated upon below, a given working set 126 can be hosted across a plurality of URL spaces (e.g., domains in which the single page applications are hosted). Consequently, the installation operation can involve registering multiple instances of the service worker 108 to enable a cross-domain installation. In this way the disclosed system enables offline execution for single page applications 116 irrespective of domain and without requiring a user to first visit every single page application 116.

In subsequent visits to the single page application 116, the synchronization engine 120 can be configured to detect changes in the working set 126 at the network server 124 and execute an update operation. As such, the plurality of information units 122 retrieved by the synchronization engine 120 later after the installation operation can be a subset of the full working set 126 containing the modified user data 128 and/or the modified single page application resources 130. Irrespective of an installation or an update, the operation of storing the information units 122 enables offline access via the data host controller 118. That is, the service worker 108, through the data host controller 118, implements a pre-cache functionality for storing necessary resources.

After initializing the single page application 116, subsequent requests can consequently originate from the single page application 116. Such requests can accordingly be proxied to a navigation handler 134 for processing. For instance, a user transitioning to a different portion of the single page application 116 may generate a fetch event for additional resources (e.g., user data, images). In response, the application controller 114 can call upon the navigation handler 134 to process the fetch event or other navigation requests via the data host controller 118. In this way, all requests are handled local to the user device 102 by the synchronization engine 120 using the synchronized set of information units 122 irrespective of network connectivity status. In this way, the synchronization engine 120 can provide a smooth user experience and reduce perceived loading times. However, in the event the synchronization engine 120 is unable to satisfy a request, the service worker 108 can fall back to the network server 124 to retrieve pertinent data.

Figure 2:
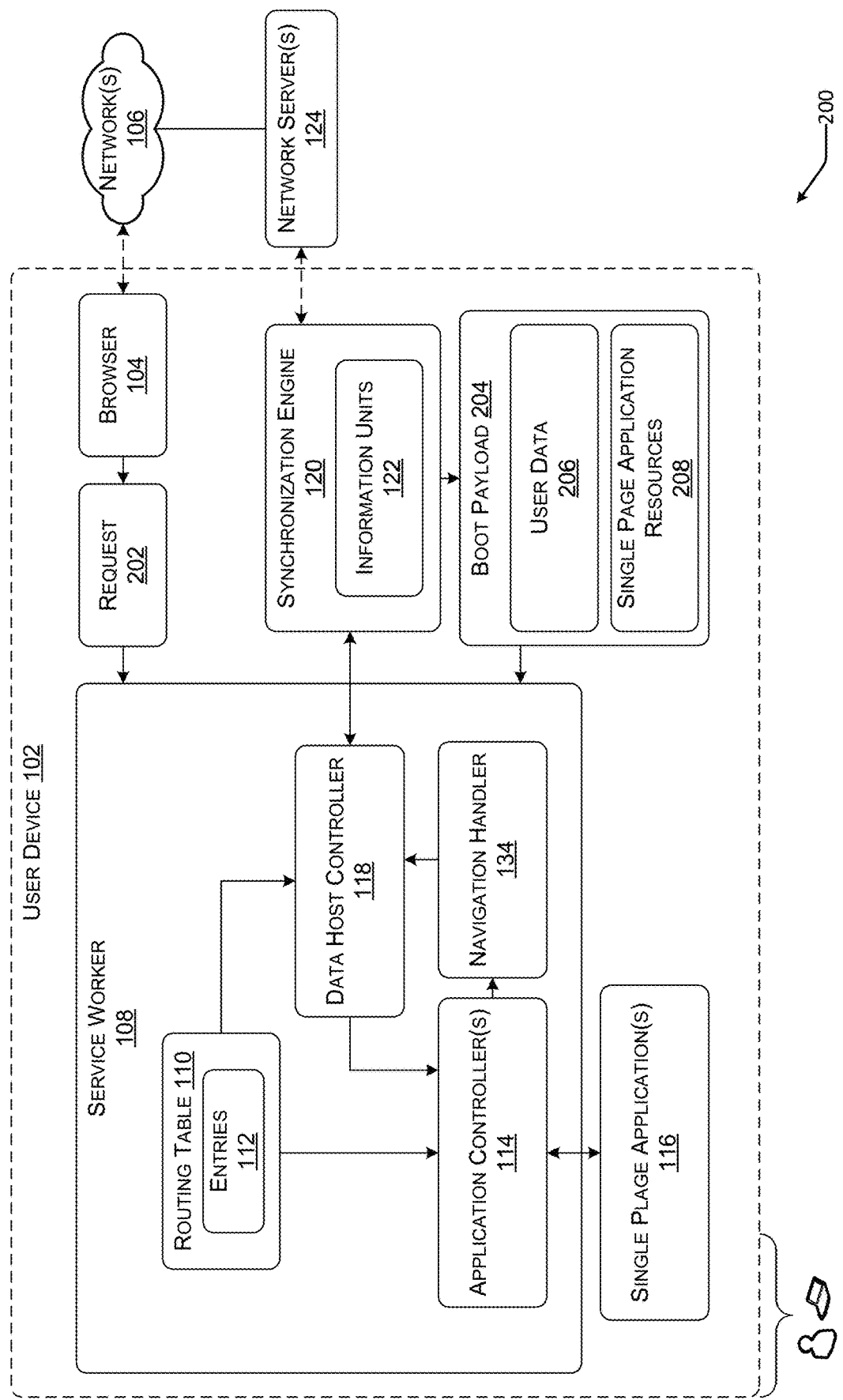
FIG. 2 is a diagram illustrating single page application operations through a service worker and synchronization engine while offline.

Turning to FIG. 2, aspects of an offline environment 200 for supporting a single page application 116 are shown and described. In the present example, a browser 104 generates a request 202 to initialize (e.g., boot) the single page application 116. As represented by the dashed line between the user device 102 and the network 106, the connection between the user device 102 and the network 106 is severed. Consequently, the network server 124 is inaccessible to the synchronization engine 120 thus preventing new data and/or resources from being retrieved. Nonetheless, the service worker 108 intercepts the request 202 as discussed above and matches a URL associated with the request 202 against an entry 112 of a routing table 110. A match at the routing table 110 accordingly identifies an application controller 114 and/or a single page application 116.

In an alternative example, the 202 request relates to a URL that is among the information units 122 but is not among the entries 112 of the routing table 110 (i.e., the user device 102 has not previously visited the URL). Consequently, the lookup at the routing table 110 results in a miss. To address such situations, the service worker 108 can be configured to issue the request 202 to the synchronization engine 120 in parallel to searching the request 202 at the routing table 110. By simultaneously issuing the request 202 to the synchronization engine 120, the service worker 108 can determine that the URL has been retrieved as part of the information units 122. In this way, the service worker 108 can serve requests for previously unvisited URLs even while disconnected from the network 106 and/or the network server 124.

The match identifying the application controller 114 and/or the single page application 116 can likewise invoke the data host controller 118. In response, the data host controller 118 proxies the request 202 to the synchronization engine 120 where the request 202 defines a second plurality of information units to be retrieved. As mentioned, the second plurality of information units can be a subset of the first plurality of information units 122 stored by the synchronization engine 120. In the present example, the second plurality of information units defined by the request 202 is data required to initialize the single page application 116. In response to the request 202 from the data host controller 118, the synchronization engine 120 generates a boot payload 204 containing a set of user data 206 and a set of single page application resources 208 (i.e., the second plurality of information units). As in the example described above with respect to FIG. 1, the user data 206 includes any data generated and/or consumed by an end user, which is used to populate a single page application 116 (e.g., work files, contact information, schedule events, and the like). In addition, the single page application resources 208 include code for rendering the single page application 116 as well as static resources such as images, and fonts.

The boot payload 204 is subsequently provided to the application controller 114 identified by the match at the routing table 110 for execution. As mentioned above, the service worker 108 is a software component that the browser 104 executes in the background via a worker thread that is separate from a main thread that executes the displayed the web page. Accordingly, the worker thread is responsible for executing the application controller 114 which is turn is responsible for providing the code (e.g., HTML) to the main thread to be rendered. Stated another way, the service worker 108 through the application controller 114 supported by the data host controller 118, binds the user data 206 to the single page application resources 208 to dynamically generate application specific code and streams the code to the main thread for rendering. In this way, the single page application 116 is progressively rendered using locally available resources thereby providing a consistent user experience and preventing visual and/or functional errors.

In furtherance of enhanced offline functionality, the synchronization engine 120 can be configured as a content delivery network (CDN). While the examples discussed with respect to FIGS. 1 and 2 illustrate the synchronization engine 120 as storing the plurality of information units 122, it should be understood that in some examples, the synchronization engine merely extracts the information units 122 from the network servers 124. The information units 122 can then be stored in a separate location (e.g., a browser cache) and accordingly be associated with individual application controller 114. For instance, a given application controller 114 can be independently responsible for a portion of the information units 122 which pertain to the single page application 116 associated with the application controller 114 stored within a browser cache.

However, by configuring the synchronization engine 120 as a content delivery network, the synchronization engine 120 is in fact responsible for storing and managing the information units 122 independent from other data stores such as the browser cache. In this way, the synchronization engine 120 can bypass technical challenges of using a separate location for storing the information units 122. For example, in a browser cache, the decision of what data is kept and what data is deleted (e.g., evicted) resides with the web browser 104. That is, the browser 104 may delete data unpredictably leading to inconsistencies in the user experience. In contrast, by placing this control under the purview of the synchronization engine 120, the system can ensure that useful data is not undesirably deleted. Furthermore, configuring the synchronization engine 120 as a content delivery network can improve the performance of the browser 104 by preventing excessive cache accesses and freeing up storage space for the browser 104.

Figure 3A:
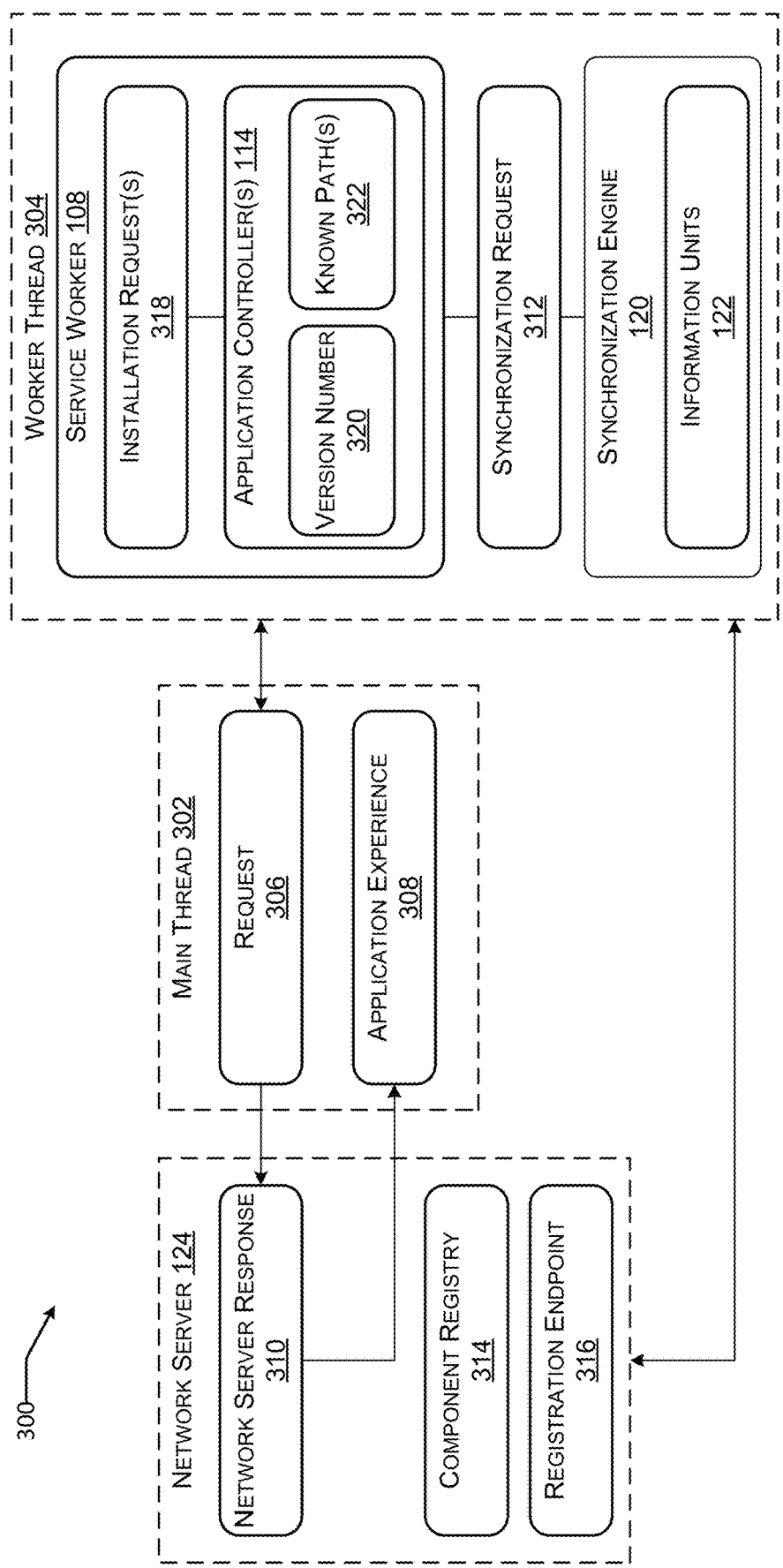
FIG. 3A is a diagram illustrating a service worker and synchronization engine performing an installation operation for a plurality of single page applications.

Proceeding to FIG. 3A, aspects of an environment 300 in which a main thread 302 and a worker thread 304 of a web browser cooperate to perform a cross-domain application installation are shown and described. As mentioned above, the main thread 302 is responsible for user facing operations such as receiving user-generated requests 306 and rendering an application experience 308 (e.g., a web page). Meanwhile, the worker thread 304 is responsible for executing the service worker 108 and associated components such as the application controller 114 and the synchronization engine 120.

In the example shown in FIG. 3A, the main thread 302 receives a request 306 navigating to a single page application for the first time (e.g., a new user with an unconfigured user device). As such, the request 306 is relayed to a network server 124 for servicing since the synchronization engine 120 does not have the data associated with the single page application stored. Accordingly, the network server 124 generates a network server response 310 containing the data defined by the request 306 such as user data and code to render the application experience 308.

In parallel to the main thread 302, the request 306 also triggers the service worker 108 executed by the worker thread 304 to generate a synchronization request 312. In various examples, the synchronization request 312 causes the synchronization engine 120 to query a component registry 314 at the network server 124 and determine a working set of user data and single page applications across various URL spaces (e.g., a domain in which one or more single page applications are hosted) which are associated with a current user. That is, the component registry 314 enumerates which application resources and user data belong to a respective URL space and accordingly which domains the current user has access to.

Once configured with a list of pertinent domains, the synchronization engine 120 can proceed to register an instance of the service worker 108 at each of the domains via a registration endpoint 316 at the network server 124. Accordingly, the synchronization engine can begin retrieving the plurality of information units 122 from the network server 124 as described above. In addition, the synchronization engine 120 configures the service worker 108 with the list of pertinent domains. In response, the service worker 108 generates an installation request 318 which causes an instantiation of a plurality of application controllers 114 for a corresponding plurality of single page applications across the domains enumerated by the component registry 314. As such, each application controller 114 executes a respective instantiation operation to install an associated single page application. In this way the disclosed system enables offline execution for single page applications irrespective of domain and without requiring a user to first visit every single page application to which the user has access.

To complete the installation process, each application controller 114 records current version number 320 of the single page application associated with the application controller 114. In addition, each application controller 114 records a set of known paths 322 defining the URLs under control of the associated application controller 114. Once the synchronization engine 120 is finished storing the information units 122, the worker thread 304 notifies the main thread 302 that the installation process is finished. At this point, the worker thread 304 is fully capable of processing a request 306 without returning to the network server 124.

Figure 3B:
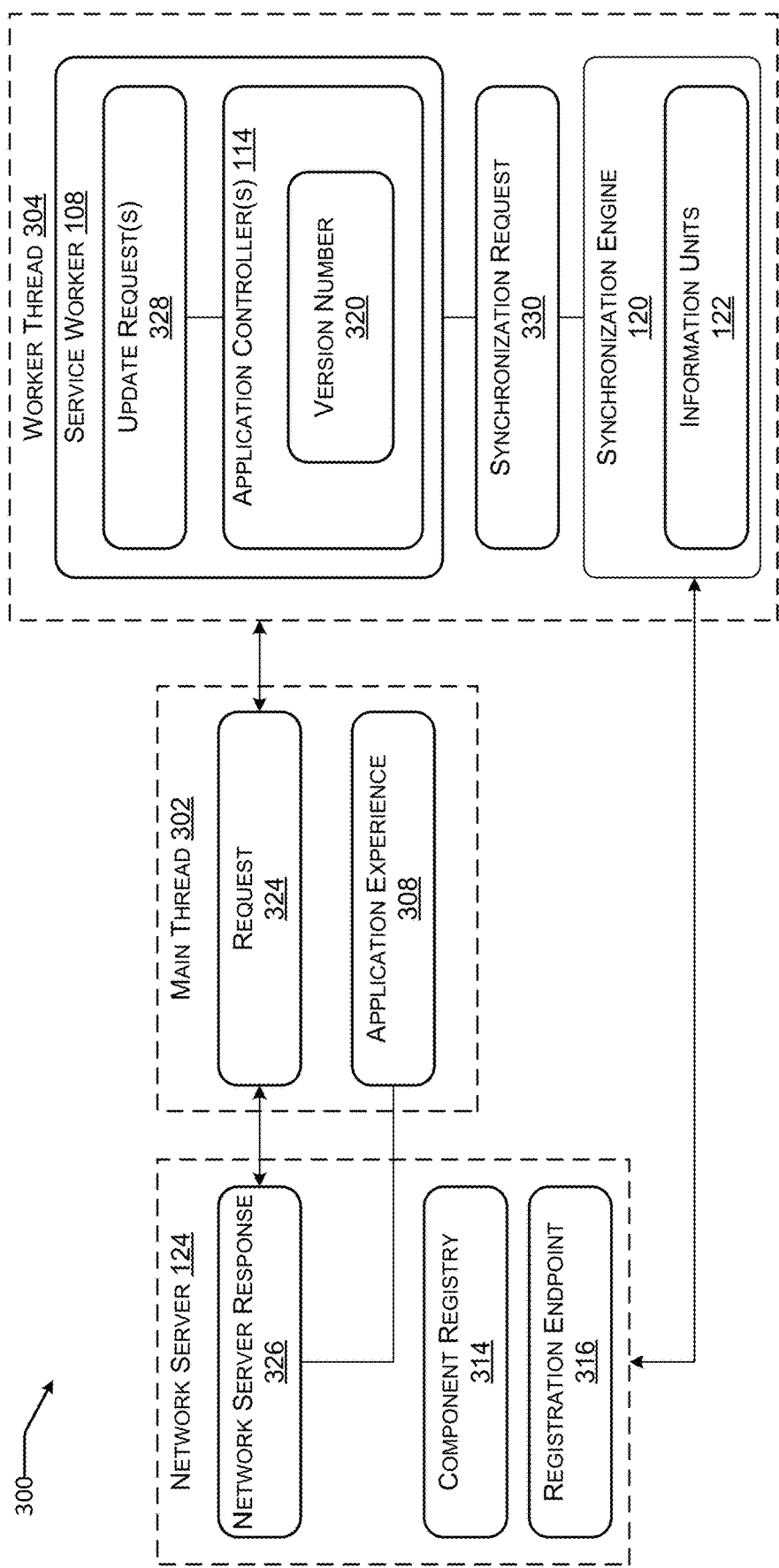
FIG. 3B is a diagram illustrating a service worker and synchronization engine performing an update operation for a single page application in response to a change at a network server.

Turning now to FIG. 3B, additional aspects of the environment 300 are shown and described. While the scenario discussed above with respect to FIG. 3A involved an initial installation phase, the example of FIG. 3B involves updating a single page application at a later point in time following the installation phase. For instance, the user device executing the main thread 302 and the worker thread 304 may disconnect from the network server 124 and operate offline for a period of time and then reconnect to the network server 124. Subsequently, the main thread 302 can generate a request 324. While the single page application is still operated by the service worker 108 the request 324 can also be transmitted to the network server 124.

In a specific, the main thread 302 generates the request 324 as part of an automatic update check. Accordingly, the network server 124 generates a network server response 326 containing data identifying the latest version of the single page application (e.g., a version number). The version number provided by the network server response 326 is then compared against the version number 320 that is stored locally to the user device by the application controller 114. If the version number 320 does not match the version identified by the network server response 326, the service worker 108 initiates an update request 328 to cause the application controller 114 to update the associated single page application. That is, in contrast to the initial installation phase discussed above, the update request 328 may selectively invoke only a portion of a plurality of application controllers 114. However, it should be understood that this version checking operation can be performed for any number of application controllers 114.

To perform the update operation, the worker thread 304 can query the network server 124. In one example, the application controller 114 queries the component registry 314 at the network server 124 to retrieve updated resources and/or data to perform an updated option. In an alternative example, the application controller 114 generates a synchronization request 330 which causes the synchronization engine 120 to query the component registry 314 on behalf of the application controller 114 and update the information units 122. Performing the update operation in this way can be suitable for situations in which the synchronization engine 120 is configured as a content delivery network and is thus responsible for storing the full set of information units 122. Conversely, utilizing the application controller 114 to retrieve updated resources can be suitable in situations in which offline resources are stored in a browser cache and the application controllers 114 are individually responsible for managing the offline resources for a respective single page application.

Figure 4A:
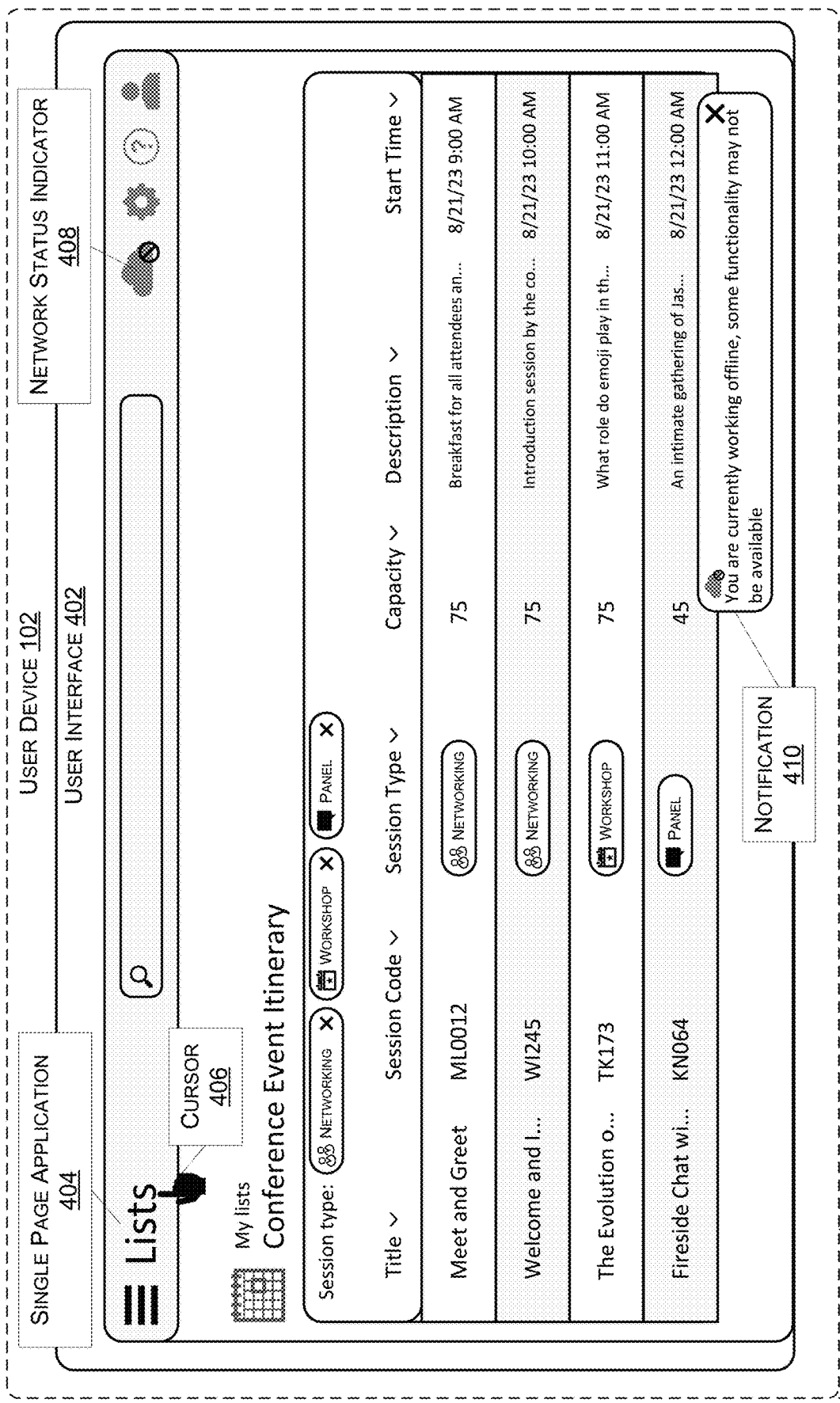
FIG. 4A is a diagram illustrating an example user interface of a single page application in which functionality is preserved while operating offline.

Proceeding to FIG. 4A, aspects of a user interface 402 of an offline single page application 404 are shown and described. In the present example, the single page application 404 is a lists application for information tracking such as managing work tasks, scheduling, and so forth. As shown, the user interface 402 is currently displaying a list titled "Conference Event Itinerary" comprising a series of sessions. Consider the context in which a user may view and edit such a list. For example, the user may be travelling to a conference and consequently have slow or inconsistent access to network connectivity. Nonetheless, it is important for the user to have access to the itinerary and keep their schedule on track. To enable this, the single page application 404 is configured to synchronize user data (e.g., a list) and provide an offline experience that maintains core functionality such as viewing and editing data within list.

For instance, the user can utilize a cursor 406 to interact with the user interface 402 such as filtering list data by session type (e.g., a networking session, a workshop, a panel). However, while the synchronization operations as described above enable a single page application 404 to preserve key functionality, some features may require a network connection to function such as file sharing and collaboration. To inform the user of current network connectivity and set expectations for available features, the user interface 402 includes a network status indicator 408 showing that the single page application 404 is currently operating offline. Furthermore, the user interface 402 includes a notification 410 stating that some functionality may not be available while operating offline.

Figure 4B:
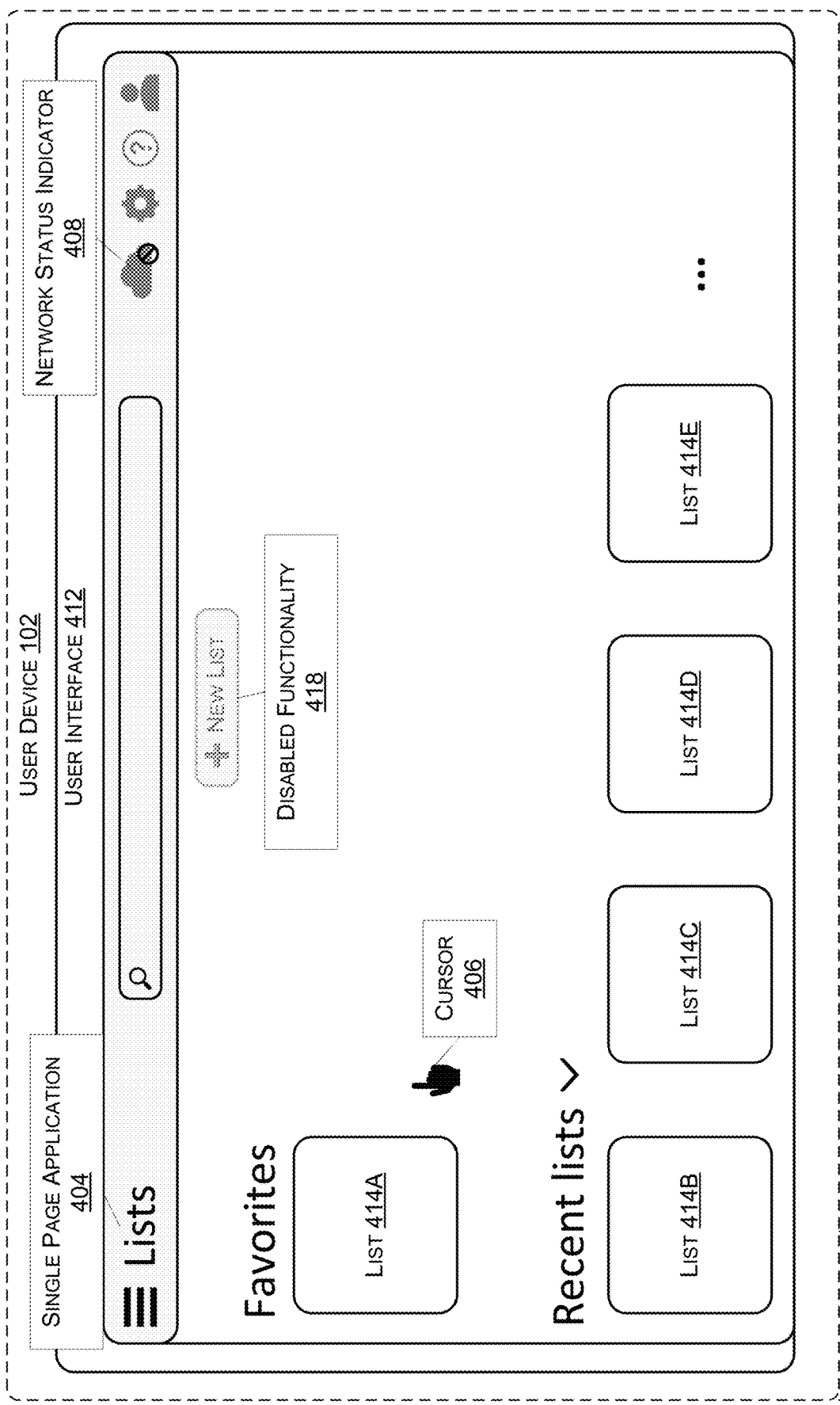
FIG. 4B is a diagram illustrating an example user interface of a single page application in which some functionality is disabled while operating offline.

Turning now to FIG. 4B, the user utilizes the cursor 406 to navigate to a different user interface 412 of the single page application 404. While the user interface 402 enables a user to view and interact with a specific list ("Conference Event Itinerary"), the user interface 412 displays a plurality of lists 414A-414E that are available offline for viewing and/or editing. For instance, the user can select a list 414A using the cursor 406 to navigate to a separate user interface to manipulate the list 414A (e.g., similar to the user interface 402).

However, some elements of the user interface 412 may represent a disabled functionality 418 while the single page application 404 is operating offline. For instance, creating a new list may require a network connection due to resolving conflicts in shared data, authentication operations, or other operations that cannot be performed offline. Accordingly, the element representing the disabled functionality 418 can be displayed in a modified manner to communicate the disabled functionality 418. As shown in FIG. 4B, the element representing the disabled functionality 418 is greyed out to indicate to the user that creating a new list is not available while operating offline. Moreover, the element representing the disabled functionality 418 can be configured as a non-selectable button. In this way, the user interface 412 can quickly apprise the user of functionalities of the single page application 404 that are available or unavailable while operating offline.

Figure 5A:
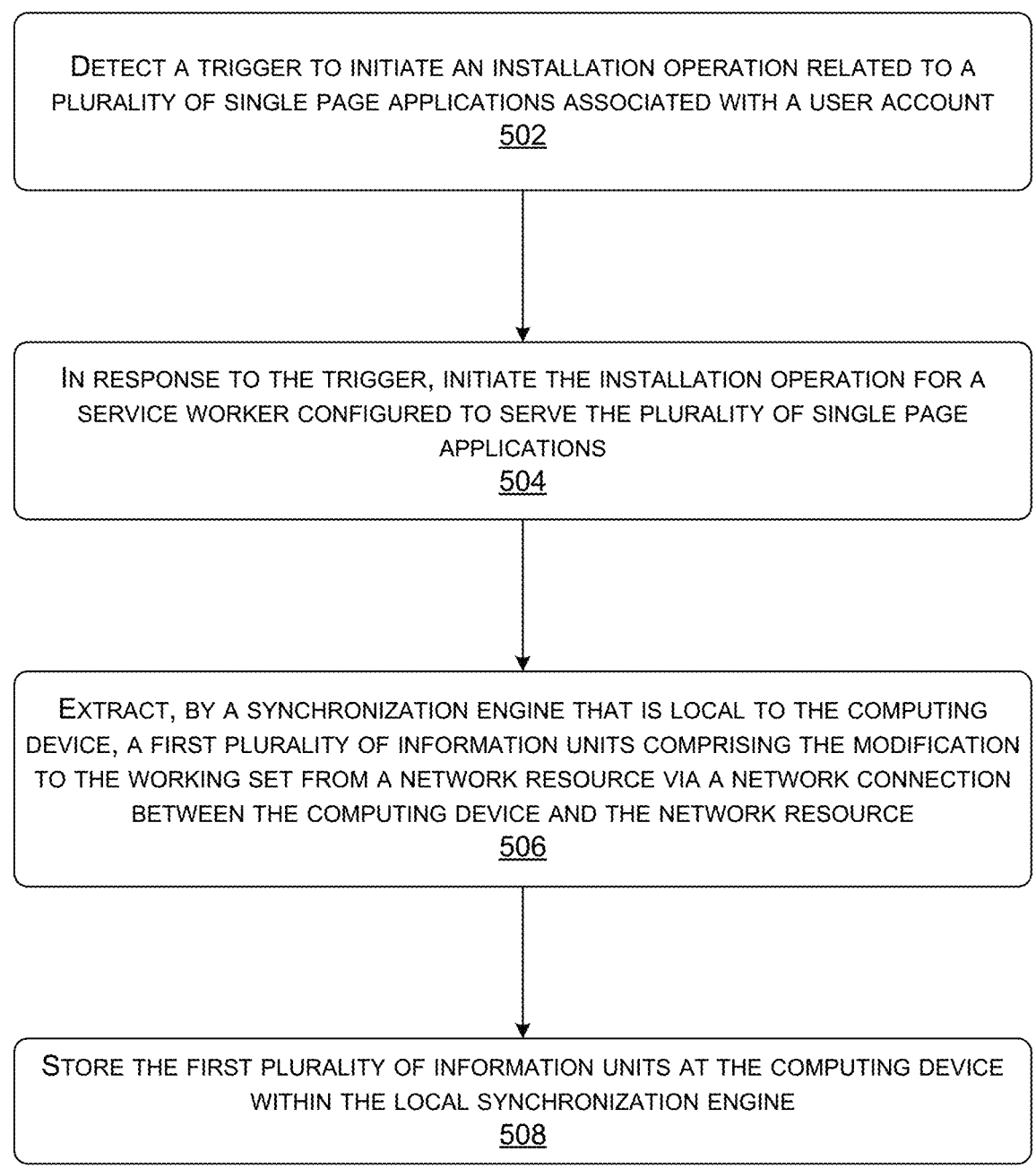
FIG. 5A is a flow diagram showing aspects of a process for retrieving and storing information units using a synchronization engine to enable offline functionality of single page applications.

Proceeding to FIGS. 5A and 5B, aspects of a process 500 for a synchronization engine, in conjunction with a service worker to retrieve and store a working set of user data and single page application resources from a network server to a user device for offline functionality are shown and described. With respect to FIG. 5A, the process 500 begins at operation 502 where a computing device detects a trigger to initiate an installation operation related to a plurality of single page applications associated with a user account. For example, the trigger can be a modification to a working set comprising user data and the plurality of single page applications associated with the user. In another example, the trigger can be a first visit, by a user, to any one of the plurality of single page applications.

Then, at operation 504, in response to the trigger, the computing device initiates an installation operation for a service worker configured to serve the plurality of single page applications.

Next, at operation 506, the computing device extracts, by a synchronization engine that is local to the computing device, a first plurality of information units comprising the modification to the working set from a network resource via a network connection between the computing device and the network resource. In one example, the service worker calls on the synchronization engine to extract the first plurality of information units.

Subsequently, at operation 508, the computing device stores the first plurality of information units at the computing device within the local synchronization engine.

Turning to FIG. 5B, the process 500 continues at operation 510 in which the computing device intercepts, by the service worker, a request defining a second plurality of information units associated with a single page application of the plurality of single page applications served by the service worker. As described above, the second plurality of information units is a subset of the first plurality of information units stored within the local synchronization engine.

Then, at operation 512, the computing device matches the request with a route path in an entry of a routing table.

Proceeding to operation 514, the computing device determines, from the entry of the routing table, an identification of the single page application of the plurality of single page applications.

Next, at operation 516, the computing device retrieves the second plurality of information units from the local synchronization engine.

Finally, at operation 518, the computing device invokes execution of the single page application utilizing the second plurality of information units retrieved from the synchronization engine.

For ease of understanding, the process discussed in this disclosure is delineated as separate operations represented as independent blocks. However, these separately delineated operations should not be construed as necessarily order dependent in their performance. The order in which the process is described is not intended to be construed as a limitation, and any number of the described process blocks may be combined in any order to implement the process or an alternate process. Moreover, it is also possible that one or more of the provided operations is modified or omitted.

The particular implementation of the technologies disclosed herein is a matter of choice dependent on the performance and other requirements of a computing device. Accordingly, the logical operations described herein are referred to variously as states, operations, structural devices, acts, or modules. These states, operations, structural devices, acts, and modules can be implemented in hardware, software, firmware, in special-purpose digital logic, and any combination thereof. It should be appreciated that more or fewer operations can be performed than shown in the figures and described herein. These operations can also be performed in a different order than those described herein.

It also should be understood that the illustrated methods can end at any time and need not be performed in their entireties. Some or all operations of the methods, and/or substantially equivalent operations, can be performed by execution of computer-readable instructions included on a computer-storage media, as defined below. The term "computer-readable instructions," and variants thereof, as used in the description and claims, is used expansively herein to include routines, applications, application modules, program modules, programs, components, data structures, algorithms, and the like. Computer-readable instructions can be implemented on various system configurations, including single-processor or multiprocessor systems, minicomputers, mainframe computers, personal computers, hand-held computing devices, microprocessor-based, programmable consumer electronics, combinations thereof, and the like.

Thus, it should be appreciated that the logical operations described herein are implemented (1) as a sequence of computer implemented acts or program modules running on a computing system and/or (2) as interconnected machine logic circuits or circuit modules within the computing system. The implementation is a matter of choice dependent on the performance and other requirements of the computing system. Accordingly, the logical operations described herein are referred to variously as states, operations, structural devices, acts, or modules. These operations, structural devices, acts, and modules may be implemented in software, in firmware, in special purpose digital logic, and any combination thereof.

For example, the operations of the process 500 can be implemented, at least in part, by modules running the features disclosed herein can be a dynamically linked library (DLL), a statically linked library, functionality produced by an application programing interface (API), a compiled program, an interpreted program, a script, or any other executable set of instructions. Data can be stored in a data structure in one or more memory components. Data can be retrieved from the data structure by addressing links or references to the data structure.

Although the illustration may refer to the components of the figures, it should be appreciated that the operations of the process 500 may also be implemented in other ways. In addition, one or more of the operations of the process 500 may alternatively or additionally be implemented, at least in part, by a chipset working alone or in conjunction with other software modules. In the example described below, one or more modules of a computing system can receive and/or process the data disclosed herein. Any service, circuit, or application suitable for providing the techniques disclosed herein can be used in operations described herein.

FIG. 6 shows additional details of an example computer architecture 600 for a device, such as the user device 102, capable of executing computer instructions (e.g., a module or a program component described herein). The computer architecture 600 illustrated in FIG. 6 includes processing system 602, a system memory 604, including a random-access memory 606 (RAM) and a read-only memory (ROM) 608, and a system bus 610 that couples the memory 604 to the processing system 602. The processing system 602 comprises processing unit(s). In various examples, the processing unit(s) of the processing system 602 are distributed. Stated another way, one processing unit of the processing system 602 may be located in a first location (e.g., a rack within a datacenter) while another processing unit of the processing system 602 is located in a second location separate from the first location. Moreover, the systems discussed herein can be provided as a distributed computing system such as a cloud service.

Processing unit(s), such as processing unit(s) of processing system 602, can represent, for example, a CPU-type processing unit, a GPU-type processing unit, a field-programmable gate array (FPGA), another class of digital signal processor (DSP), or other hardware logic components that may, in some instances, be driven by a CPU. For example, illustrative types of hardware logic components that can be used include Application-Specific Integrated Circuits (ASICs), Application-Specific Standard Products (ASSPs), System-on-a-Chip Systems (SOCs), Complex Programmable Logic Devices (CPLDs), and the like.

A basic input/output system containing the basic routines that help to transfer information between elements within the computer architecture 600, such as during startup, is stored in the ROM 608. The computer architecture 600 further includes a mass storage device 612 for storing an operating system 614, application(s) 616, modules 618, and other data described herein.

The mass storage device 612 is connected to processing system 602 through a mass storage controller connected to the bus 610. The mass storage device 612 and its associated computer-readable media provide non-volatile storage for the computer architecture 600. Although the description of computer-readable media contained herein refers to a mass storage device, the computer-readable media can be any available computer-readable storage media or communication media that can be accessed by the computer architecture 600.

Computer-readable media includes computer-readable storage media and/or communication media. Computer-readable storage media includes one or more of volatile memory, nonvolatile memory, and/or other persistent and/or auxiliary computer storage media, removable and non-removable computer storage media implemented in any method or technology for storage of information such as computer-readable instructions, data structures, program modules, or other data. Thus, computer storage media includes tangible and/or physical forms of media included in a device and/or hardware component that is part of a device or external to a device, including RAM, static RAM (SRAM), dynamic RAM (DRAM), phase change memory (PCM), ROM, erasable programmable ROM (EPROM), electrically EPROM (EEPROM), flash memory, compact disc read-only memory (CD-ROM), digital versatile disks (DVDs), optical cards or other optical storage media, magnetic cassettes, magnetic tape, magnetic disk storage, magnetic cards or other magnetic storage devices or media, solid-state memory devices, storage arrays, network attached storage, storage area networks, hosted computer storage or any other storage memory, storage device, and/or storage medium that can be used to store and maintain information for access by a computing device.

In contrast to computer-readable storage media, communication media can embody computer-readable instructions, data structures, program modules, or other data in a modulated data signal, such as a carrier wave, or other transmission mechanism. As defined herein, computer storage media does not include communication media. That is, computer-readable storage media does not include communications media consisting solely of a modulated data signal, a carrier wave, or a propagated signal, per se.

According to various configurations, the computer architecture 600 may operate in a networked environment using logical connections to remote computers through the network 620. The computer architecture 600 may connect to the network 620 through a network interface unit 622 connected to the bus 610. The computer architecture 600 also may include an input/output controller 624 for receiving and processing input from a number of other devices, including a keyboard, mouse, touch, or electronic stylus or pen. Similarly, the input/output controller 624 may provide output to a display screen, a printer, or other type of output device.

The software components described herein may, when loaded into the processing system 602 and executed, transform the processing system 602 and the overall computer architecture 600 from a general-purpose computing system into a special-purpose computing system customized to facilitate the functionality presented herein. The processing system 602 may be constructed from any number of transistors or other discrete circuit elements, which may individually or collectively assume any number of states. More specifically, the processing system 602 may operate as a finite-state machine, in response to executable instructions contained within the software modules disclosed herein. These computer-executable instructions may transform the processing system 602 by specifying how the processing system 602 transition between states, thereby transforming the transistors or other discrete hardware elements constituting the processing system 602.

Figure 7:
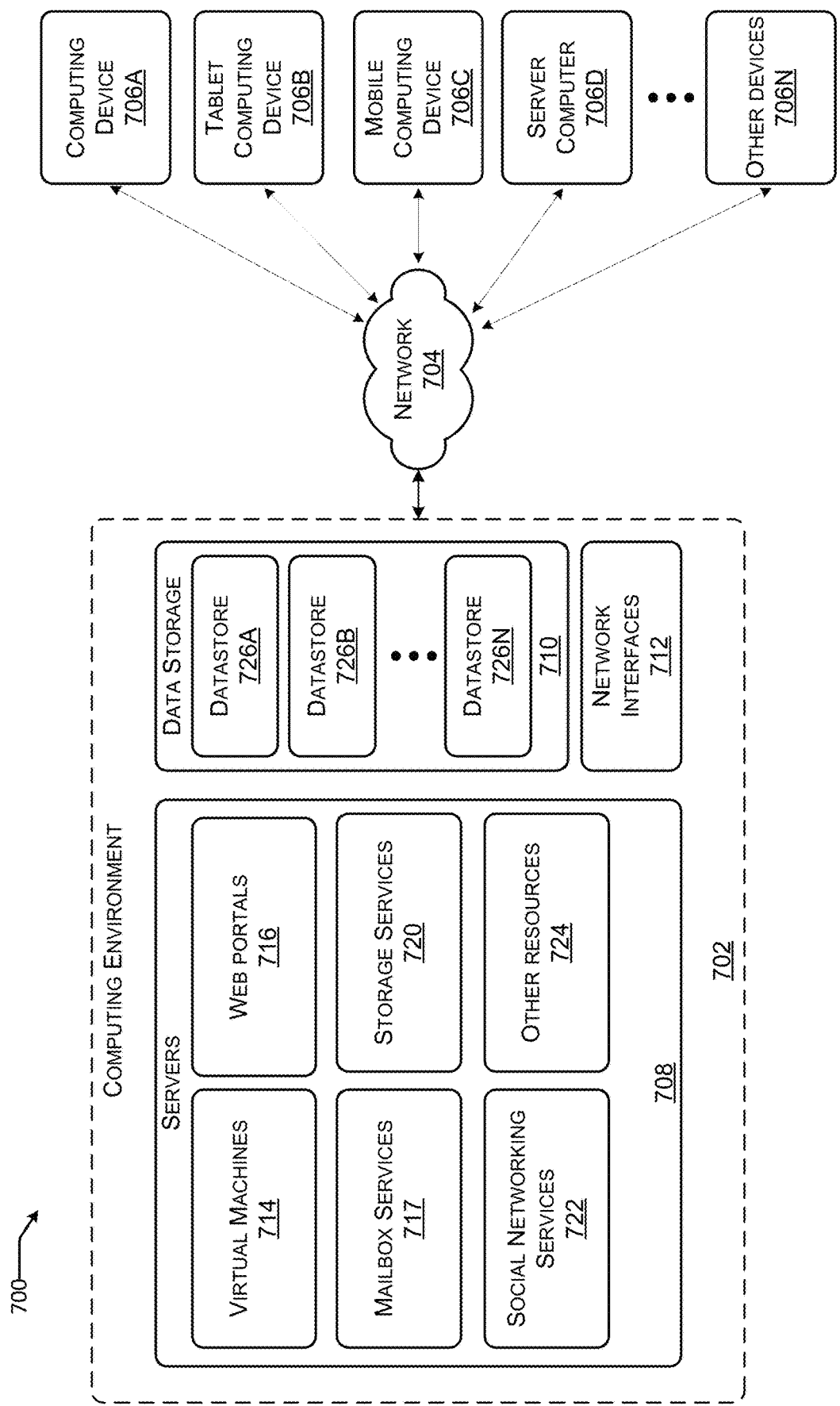
FIG. 7 is a diagram illustrating a distributed computing environment capable of implementing aspects of the techniques and technologies presented herein.

FIG. 7 depicts an illustrative distributed computing environment 700 capable of executing the software components described herein. Thus, the distributed computing environment 700 illustrated in FIG. 7 can be utilized to execute any aspects of the software components presented herein. For example, the distributed computing environment 700 can be utilized to execute aspects of the software components described herein.

Accordingly, the distributed computing environment 700 can include a computing environment 702 operating on, in communication with, or as part of the network 704. The network 704 can include various access networks. One or more client devices 706A-706N (hereinafter referred to collectively and/or generically as "computing devices 706"), such as the user device 102, can communicate with the computing environment 702 via the network 704. In one illustrated configuration, the computing devices 706 include a computing device 706A such as a laptop computer, a desktop computer, or other computing device; a slate or tablet computing device ("tablet computing device") 706B; a mobile computing device 706C such as a mobile telephone, a smart phone, or other mobile computing device; a server computer 706D; and/or other devices 706N. It should be understood that any number of computing devices 706 can communicate with the computing environment 702.

In various examples, the computing environment 702 includes servers 708, data storage 610, and one or more network interfaces 712. The servers 708 can host various services, virtual machines, portals, and/or other resources. In the illustrated configuration, the servers 708 host virtual machines 714, Web portals 716, mailbox services 718, storage services 720, and/or social networking services 722. As shown in FIG. 7 the servers 708 also can host other services, applications, portals, and/or other resources ("other resources") 724.

As mentioned above, the computing environment 702 can include the data storage 710. According to various implementations, the functionality of the data storage 710 is provided by one or more databases operating on, or in communication with, the network 704. The functionality of the data storage 710 also can be provided by one or more servers configured to host data for the computing environment 700. The data storage 710 can include, host, or provide one or more real or virtual datastores 726A-726N (hereinafter referred to collectively and/or generically as "datastores 726"). The datastores 726 are configured to host data used or created by the servers 808 and/or other data. That is, the datastores 726 also can host or store web page documents, word documents, presentation documents, data structures, algorithms for execution by a recommendation engine, and/or other data utilized by any application program. Aspects of the datastores 726 may be associated with a service for storing files.

The computing environment 702 can communicate with, or be accessed by, the network interfaces 712. The network interfaces 712 can include various types of network hardware and software for supporting communications between two or more computing devices including the computing devices and the servers. It should be appreciated that the network interfaces 712 also may be utilized to connect to other types of networks and/or computer systems.

It should be understood that the distributed computing environment 700 described herein can provide any aspects of the software elements described herein with any number of virtual computing resources and/or other distributed computing functionality that can be configured to execute any aspects of the software components disclosed herein. According to various implementations of the concepts and technologies disclosed herein, the distributed computing environment 700 provides the software functionality described herein as a service to the computing devices. It should be understood that the computing devices can include real or virtual machines including server computers, web servers, personal computers, mobile computing devices, smart phones, and/or other devices. As such, various configurations of the concepts and technologies disclosed herein enable any device configured to access the distributed computing environment 700 to utilize the functionality described herein for providing the techniques disclosed herein, among other aspects.

The disclosure presented herein also encompasses the subject matter set forth in the following clauses.

Example Clause A, a method comprising: initiating, at a computing device, an installation operation for a service worker configured to serve a plurality of single page applications associated with a user account of the computing device; extracting, by a synchronization engine that is local to the computing device, a first plurality of information units comprising a working set from a network resource via a network connection between the computing device and the network resource; storing the first plurality of information units at the computing device within the synchronization engine; intercepting, by the service worker, a request defining a second plurality of information units associated with a single page application of the plurality of single page applications served by the service worker, wherein the second plurality of information units is a subset of the first plurality of information units stored within the synchronization engine; matching the request with a route path in an entry of a routing table; determining, from the entry of the routing table, an identification of the single page application of the plurality of single page applications; retrieving the second plurality of information units from the synchronization engine; and invoking execution of the single page application utilizing the second plurality of information units retrieved from the synchronization engine.

Example Clause B, the method of Example Clause A, the second plurality of information units is retrieved from the synchronization engine in an absence of a network connection of the computing device.

Example Clause C, the method of Example Clause A or Example Clause B, wherein the working set comprises user data and the plurality of single page applications which is hosted across a corresponding plurality of domains.

Example Clause D, the method of Example Clause C, wherein: the service worker comprises a plurality of service worker instances; and each one of the plurality of service worker instances is registered to a corresponding one of the plurality of domains.

Example Clause E, the method of any one of Example Clause A through D, wherein the synchronization engine comprises a content delivery network that is configured to store information units independently from a browser data cache.

Example Clause F, the method of any one of Example Clause A through E, further comprising: determining that the second plurality of information units defined by the request cannot be retrieved from the synchronization engine; and in response to determining that the second plurality of information units defined by the request cannot be retrieved from the synchronization engine, retrieving the second plurality of information units from the network resource.

Example Clause G, the method of any one of Example Clause A through F, wherein the installation operation is initiated in response to detecting a modification to a working set comprising user data and the plurality of single page applications.

Example Clause H, the method of Example Clause G, wherein the modification to the working set comprises at least one of a modification to the user data or a modification to a single page application of the plurality of single page applications.

Example Clause I, the method of any one of Example Clause A through F, wherein the installation operation is initiated in response to a first visit to any one of the plurality of single page applications associated with the user account.

Example Clause J, a computing device comprising: a processing system; and a computer-readable medium storing instructions that, when executed by the processing system, cause the computing device to perform operations comprising: initiating an installation operation for a service worker configured to serve a plurality of single page applications associated with a user account; calling, by the service worker, on a synchronization engine, that is local to the computing device, to extract a first plurality of information units comprising a working set from a network resource via a network connection between the computing device and the network resource; intercepting, by the service worker, a request defining a second plurality of information units associated with a single page application of the plurality of single page applications served by the service worker, wherein the second plurality of information units is a subset of the first plurality of information units; matching, by the service worker, the request with a route path in an entry of a routing table; determining, by the service worker and from the entry of the routing table, an identification of the single page application of the plurality of single page applications; retrieving, by the service worker, the second plurality of information units from the synchronization engine; and invoking, by the service worker, execution of the single page application utilizing the second plurality of information units retrieved from the synchronization engine.

Example Clause K, the computing device of Example Clause J, the second plurality of information units is retrieved from the synchronization engine in an absence of a network connection of the computing device.

Example Clause L, the computing device of Example Clause J or Example Clause K, wherein the working set comprises user data and the plurality of single page applications which is hosted across a corresponding plurality of domains.

Example Clause M, the computing device of Example Clause L, wherein: the service worker comprises a plurality of service worker instances; and each one of the plurality of service worker instances is registered to a corresponding one of the plurality of domains.

Example Clause N, the computing device of any one of Example Clause J through M, wherein the synchronization engine comprises a content delivery network that is configured to store information units independently from a browser data cache.

Example Clause O, the computing device of any one of Example Clause J through N, wherein the operations further comprise: determining that the second plurality of information units defined by the request cannot be retrieved from the synchronization engine; and in response to determining that the second plurality of information units defined by the request cannot be retrieved from the synchronization engine, retrieving the second plurality of information units from the network resource.

Example Clause P, the computing device of any one of Example Clause J through O, wherein the installation operation is initiated in response to detecting a modification to a working set comprising user data and the plurality of single page applications.

Example Clause Q, the computing device of Example Clause P, wherein the modification to the working set comprises at least one of a modification to the user data or a modification to a single page application of the plurality of single page applications.

Example Clause R, the computing device of any one of Example Clause J through O, wherein the installation operation is initiated in response to a first visit to any one of the plurality of single page applications associated with the user account.

Example Clause S, a method comprising: initiating an installation operation for a service worker configured to serve a plurality of single page applications associated with a user account; calling, by the service worker, on a synchronization engine, that is local to a computing device, to extract a first plurality of information units comprising a working set from a network resource via a network connection between the computing device and the network resource; intercepting, by the service worker, a request defining a second plurality of information units associated with a single page application of the plurality of single page applications served by the service worker, wherein the second plurality of information units is a subset of the first plurality of information units; matching, by the service worker, the request with a route path in an entry of a routing table; determining, by the service worker and from the entry of the routing table, an identification of the single page application of the plurality of single page applications; retrieving, by the service worker, the second plurality of information units from the synchronization engine; and invoking, by the service worker, execution of the single page application utilizing the second plurality of information units retrieved from the synchronization engine.

Example Clause T, the method of Example Clause S, wherein the working set comprises user data and the plurality of single page applications which is hosted across a corresponding plurality of domains.

Conditional language such as, among others, "can," "could," "might" or "may," unless specifically stated otherwise, are understood within the context to present that certain examples include, while other examples do not include, certain features, elements and/or steps. Thus, such conditional language is not generally intended to imply that certain features, elements and/or steps are in any way required for one or more examples or that one or more examples necessarily include logic for deciding, with or without user input or prompting, whether certain features, elements and/or steps are included or are to be performed in any particular example. Conjunctive language such as the phrase "at least one of X, Y or Z," unless specifically stated otherwise, is to be understood to present that an item, term, etc. may be either X, Y, or Z, or a combination thereof.

The terms "a," "an," "the" and similar referents used in the context of describing the invention (especially in the context of the following claims) are to be construed to cover both the singular and the plural unless otherwise indicated herein or clearly contradicted by context. The terms "based on," "based upon," and similar referents are to be construed as meaning "based at least in part" which includes being "based in part" and "based in whole" unless otherwise indicated or clearly contradicted by context.

In addition, any reference to "first," "second," etc. elements within the Summary and/or Detailed Description is not intended to and should not be construed to necessarily correspond to any reference of "first," "second," etc. elements of the claims. Rather, any use of "first" and "second" within the Summary, Detailed Description, and/or claims may be used to distinguish between two different instances of the same element (e.g., two different single page applications).

In closing, although the various configurations have been described in language specific to structural features and/or methodological acts, it is to be understood that the subject matter defined in the appended representations is not necessarily limited to the specific features or acts described. Rather, the specific features and acts are disclosed as example forms of implementing the claimed subject matter.

The invention claimed is:

1. A method comprising:
   initiating, at a computing device, an installation operation for a service worker configured to serve a plurality of single page applications associated with a user account of the computing device, wherein the installation operation comprises:
   identifying a working set comprising user data and the plurality of single page applications, wherein the plurality of single page applications is hosted across a plurality of domains; and extracting, by a synchronization engine that is local to the computing device, a first plurality of information units comprising the working set from a network resource via a network connection between the computing device and the network resource;

storing the first plurality of information units at the computing device within the synchronization engine;

managing, by the synchronization engine, the first plurality of information units separately from a browser cache;

intercepting, by the service worker, a request defining a second plurality of information units associated with a single page application of the plurality of single page applications served by the service worker, wherein the second plurality of information units is a subset of the first plurality of information units stored within the synchronization engine;

matching the request with a route path in an entry of a routing table;

determining, from the entry of the routing table, an identification of the single page application of the plurality of single page applications;

retrieving the second plurality of information units from the synchronization engine independent of a network connection status; and invoking execution of the single page application utilizing the second plurality of information units retrieved from the synchronization engine.

2. The method of claim 1, the second plurality of information units is retrieved from the synchronization engine in an absence of a network connection of the computing device.

3. The method of claim 1, wherein:
the service worker comprises a plurality of service worker instances; and
each one of the plurality of service worker instances is registered to a corresponding one of the plurality of domains.

4. The method of claim 1, wherein the synchronization engine comprises a content delivery network.

5. The method of claim 1, further comprising:
determining that the second plurality of information units defined by the request cannot be retrieved from the synchronization engine; and
in response to determining that the second plurality of information units defined by the request cannot be retrieved from the synchronization engine, retrieving the second plurality of information units from the network resource.

6. The method of claim 1, wherein the installation operation further comprises an update operation that is initiated in response to detecting a modification to the working set at the network resource.

7. The method of claim 6, wherein the modification to the working set comprises at least one of a modification to the user data or a modification to a single page application of the plurality of single page applications.

8. The method of claim 1, wherein the installation operation is initiated in response to a first visit to any one of the plurality of single page applications associated with the user account.

9. A computing device comprising:
a processing system; and
a computer-readable medium storing instructions that, when executed by the processing system, cause the computing device to perform operations comprising:
initiating, at a computing device, an installation operation for a service worker configured to serve a plurality of single page applications associated with a user account of the computing device, wherein the installation operation comprises:
identifying a working set comprising user data and the plurality of single page applications, wherein the plurality of single page applications is hosted across a plurality of domains; and
extracting, by a synchronization engine that is local to the computing device, a first plurality of information units comprising the working set from a network resource via a network connection between the computing device and the network resource;
storing the first plurality of information units at the computing device within the synchronization engine;
managing, by the synchronization engine, the first plurality of information units separately from a browser cache;
intercepting, by the service worker, a request defining a second plurality of information units associated with a single page application of the plurality of single page applications served by the service worker, wherein the second plurality of information units is a subset of the first plurality of information units stored within the synchronization engine;
matching the request with a route path in an entry of a routing table;
determining, from the entry of the routing table, an identification of the single page application of the plurality of single page applications;
retrieving the second plurality of information units from the synchronization engine independent of a network connection status; and
invoking execution of the single page application utilizing the second plurality of information units retrieved from the synchronization engine.

10. The computing device of claim 9, the second plurality of information units is retrieved from the synchronization engine in an absence of a network connection of the computing device.

11. The computing device of claim 9, wherein:
the service worker comprises a plurality of service worker instances; and
each one of the plurality of service worker instances is registered to a corresponding one of the plurality of domains.

12. The computing device of claim 9, wherein the synchronization engine comprises a content delivery network.

13. The computing device of claim 9, wherein the operations further comprise:
determining that the second plurality of information units defined by the request cannot be retrieved from the synchronization engine; and
in response to determining that the second plurality of information units defined by the request cannot be retrieved from the synchronization engine, retrieving the second plurality of information units from the network resource.

14. The computing device of claim 9, wherein the installation operation further comprises an update operation that is initiated in response to detecting a modification to the working set at the network resource.

15. The computing device of claim 14, wherein the modification to the working set comprises at least one of a modification to the user data or a modification to a single page application of the plurality of single page applications.

16. The computing device of claim 9, wherein the installation operation is initiated in response to a first visit to any one of the plurality of single page applications associated with the user account.

17. A method comprising:
   initiating an installation operation for a service worker configured to serve a plurality of single page applications associated with a user account, wherein the installation operation comprises:
      identifying a working set comprising user data and the plurality of single page applications, wherein the plurality of single page applications is hosted across a plurality of domains; and
      calling, by the service worker, on a synchronization engine, that is local to a computing device, to extract a first plurality of information units comprising a working set from a network resource via a network connection between the computing device and the network resource;
   intercepting, by the service worker, a request defining a second plurality of information units associated with a single page application of the plurality of single page applications served by the service worker, wherein the second plurality of information units is a subset of the first plurality of information units;
   matching, by the service worker, the request with a route path in an entry of a routing table;
   determining, by the service worker and from the entry of the routing table, an identification of the single page application of the plurality of single page applications;
   retrieving, by the service worker, the second plurality of information units from the synchronization engine; and
   invoking, by the service worker, execution of the single page application utilizing the second plurality of information units retrieved from the synchronization engine.

18. The method of claim 17, wherein:
   the service worker comprises a plurality of service worker instances; and
   each one of the plurality of service worker instances is registered to a corresponding one of the plurality of domains.

19. The method of claim 17, wherein the installation operation is initiated in response to a first visit to any one of the plurality of single page applications associated with the user account.

20. The method of claim 17, wherein the synchronization engine comprises a content delivery network.

* * * * *